April 2, 1935.  R. LEPEK  1,996,679
REGULATING APPARATUS
Filed Oct. 14, 1933   2 Sheets-Sheet 1
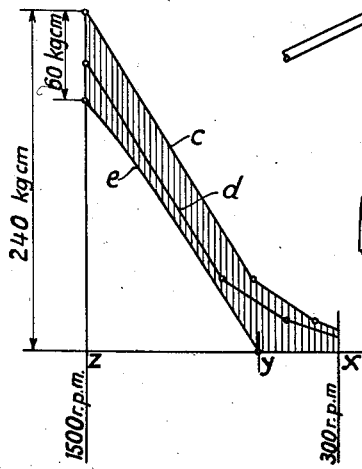
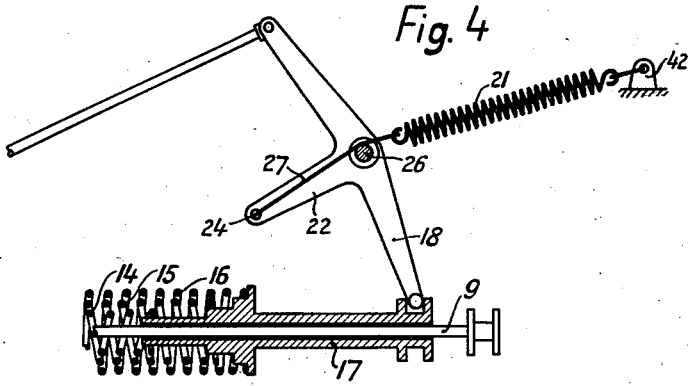
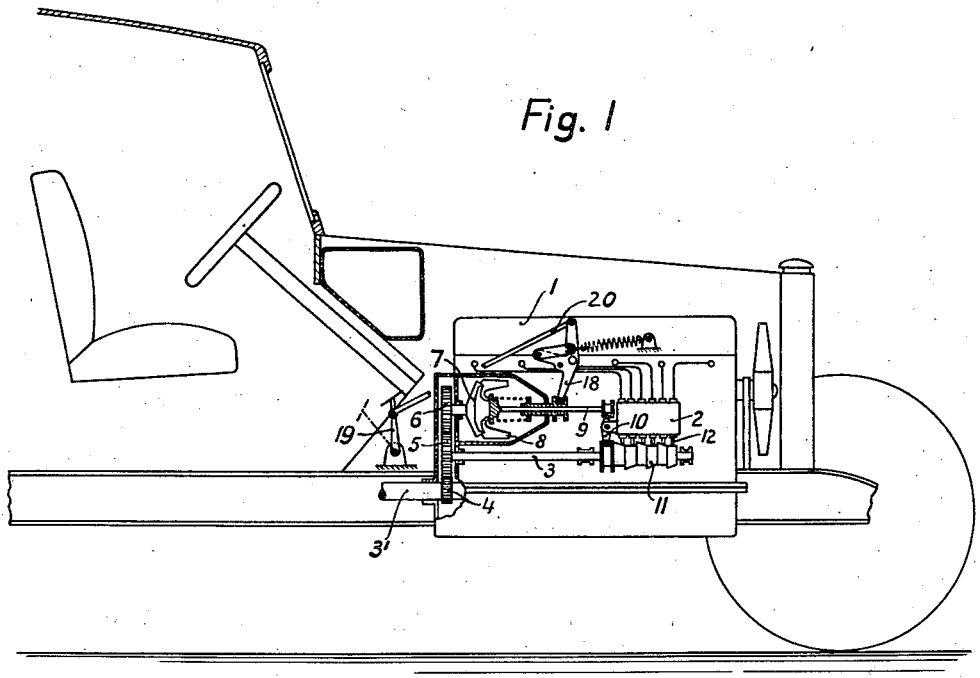
Inventor:
Rud. Lepek
by Knight Bros.
Attorneys April 2, 1935. R. LEPEK 1,996,679
REGULATING APPARATUS
Filed Oct. 14, 1933 2 Sheets-Sheet 2
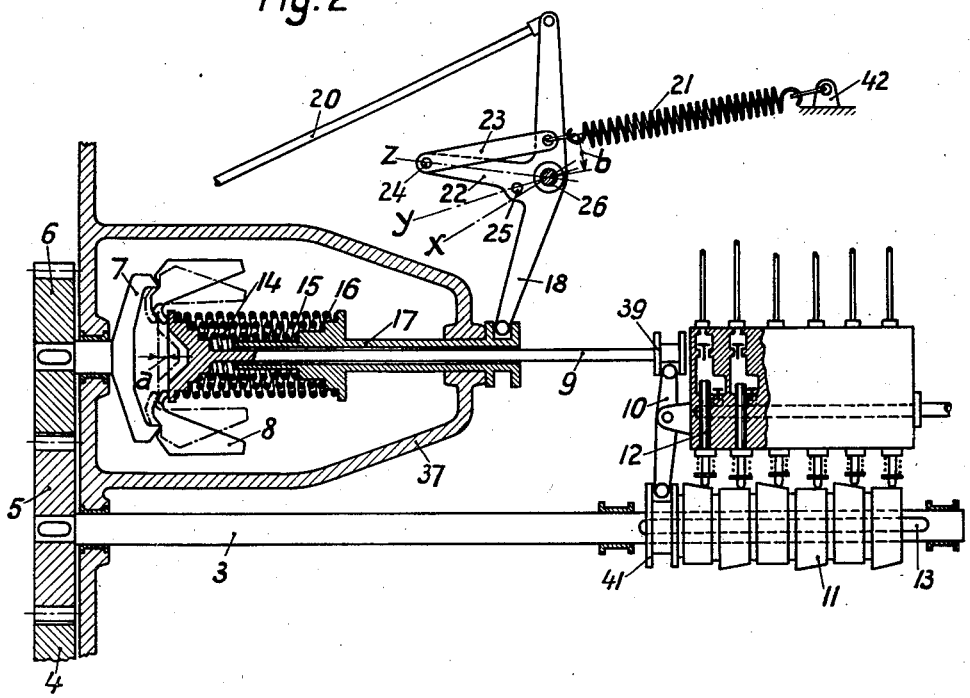
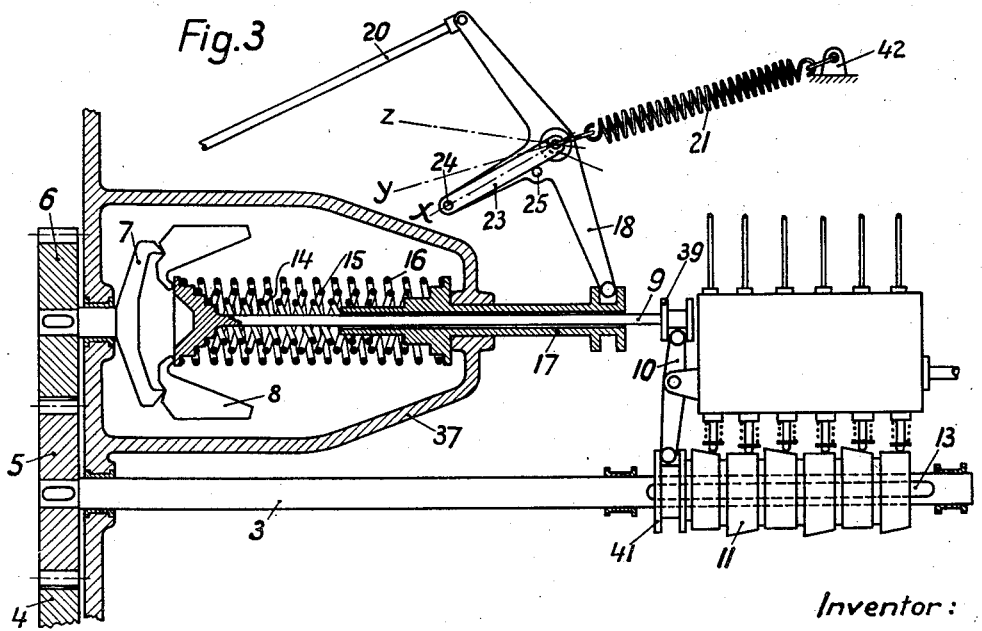
Inventor:
Rud. Lepek
by Knight Bros.
Attorneys Patented Apr. 2, 1935

1,996,679

UNITED STATES PATENT OFFICE 1,996,679

REGULATING APPARATUS

Rudolf Lepek, Cologne, Germany, assignor to Humboldt-Deutzmotoren A. G., Cologne-Deutz, Germany Application October 14, 1933, Serial No. 693,637 In Germany October 21, 1932

9 Claims. (Cl. 264—3)

This invention relates to a regulating device for an internal combustion engine which is equipped with a speed regulator to adapt the fuel feed to the load of the machine.

The invention is particularly applied to machines in which a fluid combustible material is sprayed into the combustion chambers. The fuel pumps for this purpose require proportionately large regulating forces for the regulation of the amount of combustible material which is sprayed into the combustion chambers at each stroke of the pump, which forces the speed regulator must develop. These controlling forces of the regulator are considerably higher in all types of fuel pumps than those which are necessary to turn a simple throttle valve of a carbureting machine.

The regulating device according to the instant invention is of particular importance in such machines which require the instantaneous speed to be variable within the wide limits as, for instance, in vehicles having Diesel engines. In this case, the spring loading of the regulating device is adjusted when varying the speed of the engine. When a sufficiently large regulating force is provided at the lowest speed of the machine, at the change to a higher speed, the tensioning forces of the regulating springs rise so high that it becomes difficult for the driver to exert the necessary force upon the hand lever or pedal to effect the desired increase in speed. An increase of the lengths of the control levers or their travel is not practical in order to relieve the driver of the great amount of work necessary at high speeds.

The instant invention eliminates the above difficulty by exerting on the mechanical lever a permanently connected force, which counteracts the forces of the springs of the regulating device, to take up the principal part of the work of speed regulation. By a suitable arrangement of the direction of the force, which may be caused by a weight or a spring, the moment exerted thereby is proportional to the tension of the regulating springs. At lower speeds when the springs are not greatly tensioned, the relief afforded by the arrangement according to the instant invention is excluded, whereas, at high spring tensions of the regulating device for high speeds, the relieving function is effective to its highest degree. This variation of the effect of the force applied to the pivoted control lever is obtained by changing the moment arm thereof. By the use of a proportionately long spring for applying this force and by limiting the angular travel of the regulating or control lever, the difference between the moment exerted by the regulator springs upon the lever and the counteracting moment exerted by the force applied thereon remains substantially constant.

The invention is described in detail hereinafter, taken in conjunction with the accompanying drawings wherein:—

Fig. 1 is a longitudinal sectional view of the front end of an automobile equipped with the invention, Figs. 2 and 3 are longitudinal sectional views, with certain parts in elevation, of enlarged views of the regulating device in different operating conditions, Fig. 4 shows a modified embodiment of the invention corresponding to the showing in Fig. 3, and Fig. 5 is a diagram of the regulating forces, represented by moments, attained in accordance with the instant invention.

In Fig. 1, a Diesel motor 1 is designated for the purpose of driving the vehicle. The fuel feed pump 2 is shown at the side of the Diesel motor. This pump contains six individual plungers 12 for feeding the combustible material to the spraying devices in the combustion chambers of the working cylinders of the Diesel engine. The pump 2 is driven by a group of cams 11 on the cam shaft 3, which derives its movement from the crank shaft 3' through gear wheels 4 and 5.

Figs. 2 and 3 show the details of the regulating device. Fig. 2 shows the setting of the elements for a high speed of the vehicle, and Fig. 3 for a low speed. A gear wheel 6, engaging gear wheel 5 on the cam shaft, drives the speed regulator 7 having the flyweights 8, which in turn act upon the head end of the regulating needle 9, which extends through the regulator casing 37. One end of a double-armed lever 10 engages a collar 39 at the tail end of needle 9, and the other end of lever 10 is coupled with a guide collar 41, connected with the group of actuating cams 11. The individual cams forming the group are connected with the cam shaft 3 by means of a longitudinal key 13, which prevents their rotation on the shaft but permits a longitudinal shifting controlled by the arm 10 and collar 41. Since the cams have varying heights in the course of their lengths, a longitudinal shifting thereof causes the stroke of the pistons 12 of the pump 2 to be varied, and thereby the amount of combustible material which is sprayed into the engine is regulated.

The regulator consists of three concentrically disposed spiral springs 14, 15 and 16 which abut with their left ends against the stepped head end of the regulator needle 9, and with their right ends against an enlargement of sleeve 17 which surrounds the needle 9. As may be seen in Fig. 3, only the spring 16 is compressed at low speeds and the springs 15 and 14 become effective successively in the course of reaching the setting shown in Fig. 2. The sleeve 17 may be shifted by means of control lever 18 which may be regulated by a foot pedal 19 (Fig. 1) through the connecting rod 20. The variation of the lengths of the springs effects in known manner a change in the speed of the machine which is maintained by the regulator.

The tension or compression of the regulator springs is so dimensioned that the necessary regulating force is provided at the lowest speed of machine operation, designated in Fig. 3. However, since the centrifugal force of the regulator weights increases as the square of the instantaneous speed, the tension of the springs which opposes the throw of the regulating weights assumes such a value at high speeds that the driver is not capable of exerting the necessary regulating force upon the pedal 19 to vary the speed of the machine by increasing or relieving the tension of the regulating springs. It is not possible to render easy for the driver the regulation of the speed by a simple lengthening of the pedal levers since the increased travel of the pedal necessitated thereby renders this change impractical. The length of the regulator springs and the degree of their compression in the course of regulating the speed must be sufficiently great in proportion to the variation in length thereof resulting from the centrifugal throw of the regulator weights, so that no large irregularities in speed between idle run and full load of the machine takes place. The above variation in length of the springs 14, 15 and 16, which corresponds to the end positions of the regulating weights 8, is designated by the quantity $a$ in Fig. 2.

In order that the operator of the vehicle, even at high speeds of the machine, may apply the necessary regulating force on the pedal, a spring 21 is provided in accordance with the invention which is so connected to the regulating lever 18 that the effective moment of the force exerted thereby increases with increasing tension of the regulating springs 14, 15 and 16. One end of spring 21 is connected to a fixed lug 42, and the other end thereof is connected to the free end of a link 23 which is jointed at 24 to the lateral extension 22 of the control lever 18 (Figs. 2, 3). In Fig. 3, the link 23 abuts against pin 25 on lever 18 so that its free end coincides with the pivotal axis 26 of lever 18. In this case, the pulling force of the spring 21 imposes no moment on the lever 18. In Fig. 2, the moment exerted by spring 21 corresponds to a maximum moment arm equivalent to $b$. By this arrangement, a rotation of the control lever 18 effects a variation of the effective moment arm $b$ (Fig. 2) which is utilized for varying the extent of the relieving moment afforded by spring 21. There is no variation in the length of the spring 21 in the course of the change in positions shown in Figs. 2 and 3, for any such variation would affect the force of the spring in a direction opposite to that desired. Thus, if the spring in Fig. 2 were shorter than that in Fig. 3, the force exerted thereby would be less, while the regulating springs would be tensioned more strongly, so that at higher machine speeds corresponding to the most severe tensioning of the regulating springs, the smallest relief would be afforded by spring 21. For this reason, spring 21 is initially tensioned to a high degree and is so connected with the lateral extension 22 of lever 18 that, at a shifting of the parts, the length of the spring 21 varies as little as possible. By the use of a proportionately long spring 21 and an angular travel of part 22 which is not so great, it is possible to obtain a relieving moment which is proportional to the work of compression of the springs 14, 15 and 16.

The moment relationships of the springs are illustrated in Fig. 5. The vertical lengths from the horizontal base line up to lines $c$ and $d$ represent the effective moment of the regulating springs at idle run and at full load of the machine, respectively. Points $x$, $y$ and $z$ on the horizontal base line correspond to the position of the parts designated at $x$, $y$ and $z$ in Figs. 2 and 3. The broken course of lines $c$ and $d$ is caused by the three concentric springs 14, 15 and 16 becoming effective at different speed settings. Thus, at the point $x$, which is assumed for example as the lowest speed of 300 R. P. M., only the outer spring 16 is tensioned, while a certain space remains between the right ends of springs 14 and 15 and the abutment of sleeve 17. Only after a shifting of the sleeve 17 to the left do the springs 15 and 14 come to abut successively against the sleeve 17. At the highest speed of 1500 R. P. M. in the position $z$ (Fig. 2), all three of the regulating springs are tensioned. This known arrangement of springs is for the purpose of producing an approximately uniform irregularity in speed between idle run and full load at high and low speeds. The line $e$ shows the relieving moment which is effected by spring 21. This line, which strictly speaking forms a part of a sine curve, is approximately straight by virtue of the small total travel of the part 22 and the slight total variation of the length of spring 21. The ordinates of the curve which is covered by hatching represent the remainder of the work which must be performed by the driver, and is approximately uniform. It is understood that the line $e$ must always remain below the line $d$ in order that a regulating moment may remain so that at no time will the pedal be depressed by the relieving moment.

The relieving arrangement, according to the invention, possesses another advantage. When the regulating springs are relieved by releasing the pedal 19, the moment exerted by the counter spring 21 is decreased to zero, since the force of the spring intersects the axis of the lever 22, 18. The broken course of the moment lines $c$ and $d$ causes an increase of the remainder of the moment which must be exerted by the driver beyond the point at which the counterbalancing moment becomes zero, while the counterbalancing moment line $e$ runs substantially parallel to the lines $c$ and $d$ through the major portion of their range. The provision of successively acting springs 14, 15 and 16 and a stop member 25 for bringing the force of the counterbalancing spring in the line of the pivotal center of the control lever makes possible the design of the relieving moment approximating closely the moment of the regulator springs, and furthermore prevents an overthrow of the moment arm of the counterbalancing spring in the opposite direction which would necessitate the driver overcoming the moment exerted by the latter in addition to that exerted by the regulator springs.

As explained above, Fig. 3 illustrates the setting of lever 18 for a speed of 300 R. P. M., and Fig. 2 for 1500 R. P. M. In both cases, the regulating weights are shown in full lines thrown out in their furthermost positions, signifying that the machine is running idle at both of these speeds. The effect of a load upon the regulating device is indicated by dotted lines in Fig. 2.

In accordance with the embodiment shown in Fig. 4, instead of the link 23, a wire cord 27 is used, which is jointed to the end 24 of part 22 in the manner shown in Figs. 2 and 3. At the setting of the lever at the lower speed, the cord lies against the pivotal axis 26 of the lever 18. A very small relieving moment remains in this arrangement even at low speeds. The other parts shown in Fig. 4 correspond to those illustrated in Fig. 3.

Although the invention has been illustrated as embodying a spring 21, other counter-balancing means such as weights or gas pressures may be used to produce the same results. Also, any other speed responsive means may be used in lieu of the centrifugally operated flyweights 8. For instance, such means may take the form of a member controlled by a variable fluid pressure which arises from the rotation of a pump driven by the engine which forces a fluid through a throttled opening. The invention also contemplates the extension 22 directly connected to shaft 26 independently of lever 18.

The expression "proportional", as used in the specification and claims, signifies the broad generally accepted definition of that term rather than its strict mathematical definition.

Having described my invention, I claim:—

1. A speed regulator for an internal combustion engine, comprising a member for controlling the operation of said engine at various loads between no load and full load at different speeds, speed responsive means driven by said engine for controlling said member, spring means for counteracting the effects of said speed responsive means on said member, means comprising a control lever for adjusting the tension of said spring means for different speeds, and means connected with said control lever exerting a moment thereon in a direction opposite to that exerted by said spring means, to take up a part of the work necessary for adjusting the tension of said spring means.

2. A speed regulator for an internal combustion engine, comprising a member for controlling the operation of said engine at various loads between no load and full load at different speeds, speed responsive means driven by said engine for controlling said member, spring means for counteracting the effects of said speed responsive means on said member, means comprising a control lever for adjusting the tension of said spring means for different speeds, and means exerting a yielding force connected with said control lever having a varying moment arm, whereby a moment is exerted on said lever in a direction opposite to that exerted by said spring means and in proportion thereto, to take up a part of the work necessary for adjusting the tension of said spring means.

3. A speed regulator for an internal combustion engine, comprising a member for controlling the operation of said engine at various loads between no load and full load at different speeds, speed responsive means driven by said engine for controlling said member, spring means for counteracting the effects of said speed responsive means on said member, means comprising a pivoted control lever for adjusting the tension of said spring means for different speeds, and a spring connected with said control lever having a varying moment arm from the pivot of said lever, whereby a moment is exerted on said lever in a direction opposite to that exerted by said spring means and in proportion thereto, to take up a part of the work necessary for adjusting the tension of said spring means.

4. A speed regulator for an internal combustion engine, comprising a member for controlling the operation of said engine at various loads between no load and full load at different speeds, speed responsive means driven by said engine for controlling said member, spring means for counteracting the effects of said speed responsive means on said member, means comprising a pivoted control lever for adjusting the tension of said spring means for different speeds, a lateral extension on said lever near the pivot of the control lever, and a long strongly tensioned spring connected to the end of said extension having a varying moment arm from the pivot of said control lever in the course of a limited angular travel thereof, whereby a moment is exerted on said lever in a direction opposite to the moment exerted by said spring means and in proportion thereto, so that the difference between these moments is substantially constant.

5. A speed regulator for an internal combustion engine, comprising a member for controlling the operation of said engine at various loads between no load and full load at different speeds, speed responsive means driven by said engine for controlling said member, spring means for counteracting the effects of said speed responsive means on said member, means comprising a pivoted control lever for adjusting the tension of said spring means for different speeds, a spring connected with said control lever having a varying moment arm from the pivot of said control lever whereby a moment is exerted on said lever in a direction opposite to that exerted by said spring means and in proportion thereto, said spring being so connected with the control lever that upon decreasing the moment exerted thereby to substantially zero, the force exerted by the spring acts at least approximately in the line of the pivot of the control lever and remains in that position upon the further travel of the lever to exert no counter-balancing effect upon the force exerted by the spring means of the regulator.

6. A speed regulator for an internal combustion engine, comprising a member for controlling the operation of said engine at various loads between no load and full load at different speeds, speed responsive means driven by said engine for controlling said member, spring means for counteracting the effects of said speed responsive means on said member, means comprising a pivoted control lever for adjusting the tension of said spring means for different speeds, a lateral extension mounted on the pivot of the control lever, a member pivoted at one end to the end of said extension, a spring connected to the other end of said member, said member and spring having a varying moment arm in the course of movement of said control lever, whereby a moment is exerted on said lever in a direction opposite to that exerted by said spring means and in proportion thereto, to take up a part of the work necessary for adjusting the tension of said spring means.

7. A speed regulator for an internal combustion engine, comprising a member for controlling the operation of said engine at various loads between no load and full load at different speeds, centrifugally operated means driven by said engine for controlling said member, spring means for counteracting the effects of said centrifugally operated means on said member, means comprising a pivoted control lever for adjusting the tension of said spring means for different speeds, a lateral extension on said lever near the pivot of the control lever, a rigid member jointed at one end to the end of said extension, a spring connected to the other end of said member, said member and spring having a varying moment arm in the course of movement of said control lever whereby a moment is exerted on said lever in a direction opposite to that exerted by said spring means and in proportion thereto, to take up a part of the work necessary for adjusting the tension of said spring means, and a pin on said control lever for supporting said rigid member during a portion of the travel of the control lever to dispose the line of action of said spring across the pivotal axis of said control lever, to exclude the relieving effect thereof at low speeds.

8. A speed regulator for an internal combustion engine, comprising a member for controlling the operation of said engine at various loads between no load and full load at different speeds, centrifugally operated means driven by said engine for controlling said member, spring means for counteracting the effects of said centrifugally operated means on said member, means comprising a pivoted control lever for adjusting the tension of said spring means for different speeds, a pivotal shaft for said control lever, a lateral extension on said lever near the pivot of the control lever, a flexible member jointed to the end of said extension, a spring connected to said flexible member, said member and spring having a varying moment arm in the course of movement of said control lever, whereby a moment is exerted on said lever in a direction opposite to that exerted by said spring means and in proportion thereto, to take up a part of the work necessary for adjusting the tension of said spring means, said flexible member being so disposed on said control lever that it is supported on said pivotal shaft during a portion of the travel of the control lever for low speed settings, to diminish the relieving effect thereof to substantially zero.

9. A regulator for an energy converter comprising a member for controlling the operation of said energy converter at various loads for a range of speeds between low speed and high speed, speed responsive means driven by said energy converter for controlling said member, resilient counter-balancing means reacting against said member in opposition to the force exerted by said speed responsive means, means comprising a control lever for varying the effect of said counter-balancing means for different speeds, and means connected with said control lever exerting a varying effect thereon in proportion to the effect of said counter-balancing means at different speeds.

RUDOLF LEPEK.